W. NELAN.
METHOD OF MANUFACTURING WHITING.
APPLICATION FILED MAR. 30, 1908.
950,793.
Patented Mar. 1, 1910.
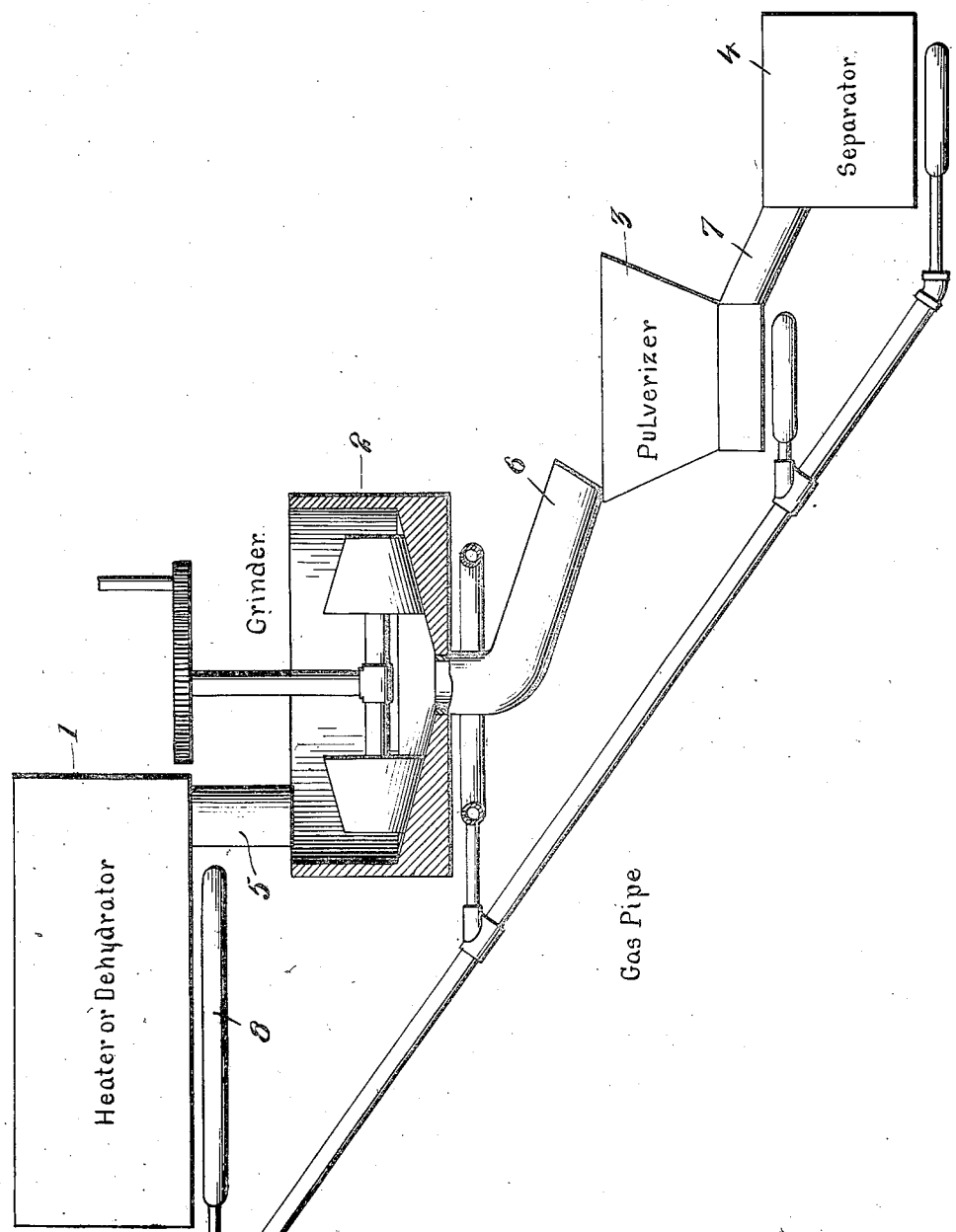

UNITED STATES PATENT OFFICE.

WILLIAM NELAN, OF AKRON, OHIO.

METHOD OF MANUFACTURING WHITING.

950,793.  Specification of Letters Patent.  Patented Mar. 1, 1910.

Application filed March 30, 1908. Serial No. 424,107.

*To all whom it may concern:*

Be it known that I, WILLIAM NELAN, a citizen of the United States, residing at Akron, in the county of Summit and State of Ohio, have invented new and useful Improvements in Methods of Manufacturing Whiting, of which the following is a specification.

This invention relates to improvements in methods for producing whiting from chalk.

Chalk chemically, as is well known, is a raw form of calcium carbonate ($CaCO_3$) and whiting is refined chalk which has usually been produced in the past by means of what is known as the "water process" which comprises thoroughly hydrating the chalk by mixing it with water in a tank in which it is kept agitated by revolving wheels. The resulting mixture is drawn from the tank through an opening near the top into settling tanks connected with one another at the top. The whiting carried in suspension is deposited in these various tanks and separated from the water by precipitation. The coarsest grade of whiting produced by this process is deposited in the tank nearest the mixing tank and the finest grade in the tank farthest from the mixing tank with the intermediate grades of whiting deposited respectively in the intervening tanks between the two extremes. The amount of grit in the whiting in the first settling tank is practically the same as in the raw chalk but the amount of grit in the remaining tanks decreases proportionately as the mixture approaches the last tank. The purpose of the water is to effect this separation. The whiting thus deposited in the various tanks is drawn off and dried in order to render it a commercial product.

My process consists first in dehydrating the raw chalk by heating, as completely as possible, without burning the chalk or in other words without reducing the chalk to lime as done when it is burned in regular lime kilns. It is essential that the chalk during the process of dehydration should not be heated to a red heat or to a heat which would dissociate it into calcium oxid (CaO) and carbon dioxid ($CO_2$) but approach this heat as nearly as possible in order to insure the most perfect results. It is also possible to dehydrate the chalk by heating the same to a considerably lower degree of heat than that named and still produce a commercial grade of whiting. The degree of heat to which the chalk is subjected to dehydrate the chalk can be between 23° C. and 300° C., depending upon the character of the chalk and without dissociating the chalk. When dehydrated, the chalk is subjected to grinding, pulverizing and separating devices for reducing it to the various degrees of fineness depending upon the grade of whiting required.

Better results will be obtained if the chalk be kept both in a dehydrated and heated condition during the process of grinding, pulverization and separation, as I have discovered that the higher the temperature of the chalk without burning the same during the processes of dehydration, grinding, pulverizing and separating, the finer the resulting product will be; while the lower the temperature and the greater degree of water saturation the coarser the resulting product. However, it is not absolutely essential that the chalk be kept in a heated condition during the grinding, pulverizing and separating of the same into whiting; but it is essential to the perfect carrying out of this process that the chalk be reduced to whiting while in a dehydrated condition as the reabsorption of moisture renders it unsuitable for conversion to the finer grades of commercial whiting.

The foregoing process is an adaptation or carrying into effect the old established law of physics that solids expand when heated and contract when cooled. The molecules or particles comprising the chalk are dehydrated and expanded by heat permitting them to be more easily acted upon by the grinding, pulverizing and separating mechanical agencies, thus making it possible to produce finer grades of whiting than could be produced by the old well known water process.

I have discovered that chalk, chemically known as a form of calcium carbonate, may be heated to such a degree as to thoroughly dehydrate the same and the calcium carbonate when thus heated may be ground, pulverized and separated into whiting preferably under the action of heat and still remain calcium carbonate so long as the heat to which the chalk is subjected is not sufficient to dissociate it in calcium oxid and carbon dioxid.

This process differs from the old, well known water process in the following respects: My process is dehydration and the old process is hydration. The separation of the coarser particles from the fine, in my process is done by grinding, pulverizing and separating by mechanical agencies preferably under heat and in the old process the separation is done through the agency of water. It is in many respects an improvement over the old method as a much greater proportion of the finest whiting can be produced from the same amount of chalk than can be obtained by the old water process. It is much shorter and quicker than the old; all of these differences combining to greatly reduce the cost of production and increase the quality of the product.

As showing one form of an apparatus in which a method for manufacturing whiting in accordance with this invention can be carried out, reference is had to the accompanying drawing which illustrates an apparatus for such purpose diagrammatically.

Referring to the drawing, 1 denotes a heater or dehydrater, 2 a grinder, 3 a pulverizer and 4 a separator. The heated material from the heater or dehydrater is discharged into the grinder 2 through the medium of the conducting pipe 5, the material from the grinder is discharged into the pulverizer by the conducting pipe 6 and the material from the pulverizer 3 is discharged into the separator 4 by the conducting pipe 7.

The heating devices or the dehydrated grinder, pulverizer and separator are indicated by the reference character 8. The heating devices are shown for the purpose of not reheating the material but to maintain it in a state of dehydration during the steps of the method. It is not essential to use the heating devices for the grinder, pulverizer and separator because in most cases the material is heated to such an extent in the heater or dehydrater that it will be maintained in a state of dehydration as it passes through the grinder, pulverizer and separator. In case however, that the character of the material is such as to cause it to become hydrated when it leaves the heater or dehydrater, or in case the surroundings are such as to cause the material when it leaves the heater or dehydrater to become hydrated, then the supplementary heating devices are employed to prevent the material from entering a hydrated state.

Having thus described my invention, what I claim and desire to secure by Letters Patent, is:—

1. The method of producing whiting from chalk which consists in subjecting the chalk to a non-dissociating heat-dehydration sufficient to completely eliminate moisture and while in this state successively subjecting it to grinding, pulverizing and separating operations.

2. A method of producing whiting from raw chalk which consists in first subjecting the chalk to a degree of heat just below the point of dissociation to thoroughly dehydrate the chalk, and then grinding, pulverizing and separating the dehydrated material while maintaining the material in a dehydrated condition.

In testimony whereof I have hereunto set my hand in presence of two subscribing witnesses.

WILLIAM NELAN

Witnesses:
JAMES M. HYNEMAN,
LOTTIE NUSBAUM.